United States Patent [19]

Andersson

[11] Patent Number: 5,010,343
[45] Date of Patent: Apr. 23, 1991

[54] METHOD AND DEVICE IN THE ANTENNA AND RECEIVING SYSTEM OF A RADIO THEODOLITE

[75] Inventor: Henry Andersson, Espoo, Finland
[73] Assignee: Vaisala Oy, Finland
[21] Appl. No.: 352,836
[22] Filed: Apr. 25, 1989
[30] Foreign Application Priority Data
  Apr. 26, 1988 [FI] Finland ................... 881956
[51] Int. Cl.$^5$ ................... G01S 5/04
[52] U.S. Cl. ................... 342/432; 342/433; 342/442; 342/444
[58] Field of Search ........... 342/442, 432, 437, 445, 342/444, 435, 433, 423, 424

[56] References Cited

U.S. PATENT DOCUMENTS 3,975,736 8/1976 Ewen .
4,328,499 5/1982 Anderson et al. ........... 342/424
4,809,012 2/1989 Tong ........... 342/442

OTHER PUBLICATIONS

Rohde & Schwarz GmbH & Co. KG, Direction Finding and Radiolocation, News Special, pp. 78-82 and 90.
George Oeh and Al Lampell, Advanced Techniques Give One-Degree Accuracy in VHF/UHF Direction Finding, MSN: Mar. 1984, pp. 145-157.

Primary Examiner—Gregory C. Issing
Attorney, Agent, or Firm—Jones, Askew & Lunsford

[57] ABSTRACT

Method and device in the antenna and receiving system of a radio theodolite, wherein the radio signal arriving from the transmitter of the object (31) to be measured is received by means of at least three antennas (1 ... n−1) in the antenna field (AK) as well as by means of a reference antenna (n). The signals received from said antennas are passed to the receiving system, being controlled and selected by an antenna-selection switch (10a). By means of said system, the phase differences between the signals of different antennas are detected and measured, on the basis of which phase differences it is possible to calculate the angles of incidence ($\alpha,\epsilon$) of the signals on the basis of the known coordinates of location of the antennas in the antenna field (AK). In the method an outer reference antenna (n+1) is used which does not belong to the antenna field (AK) proper. The phases of the antennas (1 ... n−1) belonging to the antenna field proper and of the inner reference antenna (n) are measured in relation to the reference signal obtained from said outer reference antenna (n+1) and from the receiver (12) connected to same so that no calibration is required between the measurement branches and the reference branches.

4 Claims, 3 Drawing Sheets

FIG. A
PRIOR ART

α = AZIMUTH ANGLE   N = NORTH
ε = ELEVATION ANGLE  E = EAST
h = SONDE ALTITUDE FROM GROUND LEVEL

METHOD AND DEVICE IN THE ANTENNA AND RECEIVING SYSTEM OF A RADIO THEODOLITE

The invention concerns a method in the antenna and receiving system of a radio theodolite, wherein the radio signal arriving from the transmitter of the object to be measured is received by means of at least three, preferably more than three, antennas in the antenna field as well as by means of a reference antenna, the signals received from said antennas being passed to the receiving system, being controlled and selected by an antenna-selection switch, by means of which said receiving system the phase differences between the signals of different antennas are detected and measured, on the basis of which phase differences it is possible to calculate the angles of incidence of the signals on the basis of the known coordinates of location of the antennas in the antenna field by means of a trigonometric procedure.

Further, the invention concerns a radio theodolite apparatus intended for carrying out the method of the invention, comprising an antenna field, which includes an inner reference antenna as well as an antenna selection unit, receiver devices, phase-measurement devices, amplitude-measurement devices, control and measurement devices, as well as possible devices for calculation of the measurement results.

In prior art, radio theodolites are known, which mean an equipment by means of which it is possible to locate a radio transmitter by finding out the direction of arrival of the radio signal, which is usually assumed to be a plane wave, i.e. by finding out the azimuth and elevation angles in the selected system of coordinates. Various methods suitable for accomplishing a radio theodolite are described, among other things, in the source /1/ *Rohde & Schwartz News*, "Direction Finding and Radiolocation", pp. 78 ... 82.

In the following, the main principles of the operation of prior-art interferometers will be described. An interferometer consists of an antenna field, which consists of at least three, in practice usually more than three, antennas and of radio receivers as well as of a device for measurement of phase difference. By measuring the phase differences of the signals of the antennas, the angles of incidence of the signal, which is assumed to be a plane wave, can be calculated by means of a simple trigonometric procedure when the locations of the antennas are known precisely. The principle of operation is described, e.g., in the above source /1/.

In the prior-art interferometers, problems are caused by signals reflected from obstacles placed at the proximity and from the ground surface, which said signals distort the electromagnetic field to be measured and cause an error in the determination of the direction. In the way known in prior art, attempts have been made to reduce this problem by using a number of antennas higher than the necessary three antennas and by, in addition to the phase, also measuring the amplitudes of the antenna signals. Owing to interference, the reflections cause changes in amplitude in the signals, and by observing these changes it is possible to include only those antennas in the calculation of the direction from which a signal free from reflections is obtained at each particular time.

With the prior-art devices, the accuracy of the determination of the direction is limited by the size of the antenna field, i.e. by the base in the triangulation, so that, when the distance between the antennas is increased, the accuracy is also increased when the other factors, such as the accuracy of measurement of the phase difference, remain invariable. When the distance between the antennas becomes larger than half a wavelength, unequivocalness is, however, lost, i.e. several possible directions of arrival are obtained for the signal. The correct direction of arrival can be found out even in an antenna field that uses a large base by, in addition to the large antenna group, also using a smaller antenna group, by means of which an unequivocal directional pattern is obtained.

The measurement of a phase difference between the signals of the antennas requires at least two superheterodyne receivers, by means of which the incoming signals are transferred to a sufficiently low frequency in order that it should be possible to measure their phase difference and amplitude precisely.

The prior-art systems for the measurement of the antenna signal of a radio theodolite have involved certain drawbacks and deficiencies, which were partly already discussed above, the main objective of the present invention being to eliminate said drawbacks and deficiencies.

In view of achieving the objectives given above and those that will come out in the following, the method of the invention is mainly characterized in that in the method an outer reference antenna is used which does not belong to the antenna field proper, and that the phases of the antennas belonging to the antenna field proper and of the inner reference antenna are measured in relation to the reference signal obtained from said outer reference antenna and from the receiver connected to same so that no calibration is required between the measurement branches and the reference branches.

On the other hand, the equipment in accordance with the invention is mainly characterized in that to the antenna system of the equipment a reference antenna not belonging to the antenna field proper and a related receiver are connected, whereby the phases of the signals of all the antennas belonging to the antenna field proper can be measured in relation to the reference signal obtained into said receiver.

An essential novelty in the method of the invention is the addition and use of an outer reference antenna not belonging to the antenna field proper. From this reference antenna a signal is received by means of which it is possible to replace the calibration signal generator with diode switches necessary in the prior-art method. The phases of all the antennas belonging to the antenna field proper, including the inner reference antenna, are measured in relation to the reference signal obtained from the outer reference antenna and from the related receiver. Thus, all signals of the antenna field proper pass along the same route from the antenna switch forwards, so that no calibration is required between the measurement branches and the reference branches.

It is to be ascertained that, by means of the method and device in accordance with the invention as such, it is not possible to measure distance, but only the direction. If necessary, distance can be measured by other means, e.g. in the case of radiosondes, on the basis of a pressure message transmitted by the sonde. The method of the invention can be applied in several different connections, such as in the monitoring of radiosondes or satellites or in aircraft approach apparatuses.

In sonde applications of the invention, it is possible to provide a method and an equipment for the measurement of wind which is not dependent on the Omega or Loran systems. One important advantage of the invention is, e.g. in military applications, as compared with the radar, that the device is a passive, i.e. non-transmitting device, so that it cannot be located.

For example, in accurate monitoring of the locations of satellites, it is possible to use several theodolite devices in accordance with the invention or corresponding other devices so that the location of a satellite can be determined highly accurately.

By means of the invention, several advantages of different directions are accomplished at the same time, of which said advantages the following might be mentioned briefly and in the form of a list:

All essential signals pass along the same route, whereby any phase errors resulting from drift of the equipment are compensated; phase changes between the outer reference and the measurement channel are not effective, because they are usually slow as compared with the taking of samples, the RF-application is simpler, no calibration generator is needed (the frequency follows the frequency that is being received), no calibration switch is needed, no branching means for the calibration signal is needed, the wiring of cables is simpler and there are fewer components susceptible to phase drift, of the equipment, only the antenna connector remains to be placed outdoors. In the prior-art methods, the 400 MHz input ends, the calibration switch, and the branching means had to be placed outdoors, for the reference branch, it is possible to use the receiver belonging to the system almost as such.

In the following, to begin with, the prior art most closely related to the present invention will be described, and then preferred ex-emplifying embodiments of the invention will be described in detail, reference being made to the figures in the accompanying drawing.

FIG. A is a block diagram illustration of a prior-art measurement method.

Figure 1:
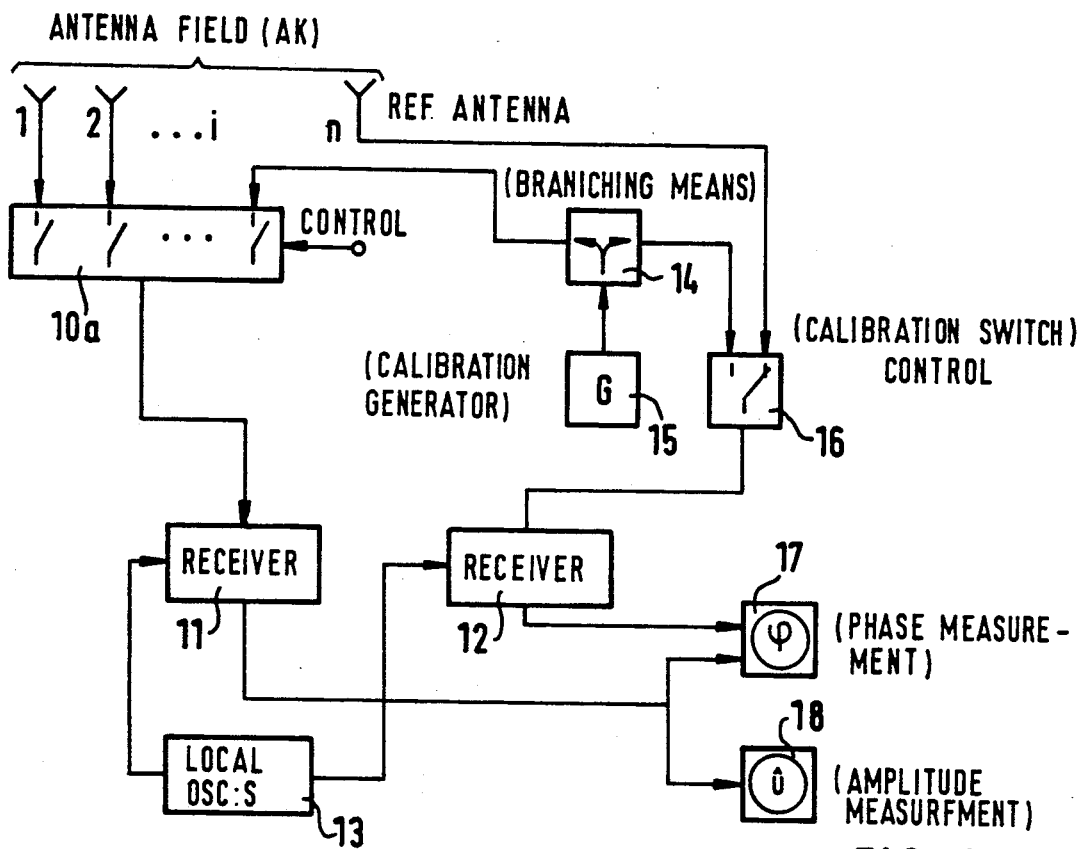
FIG. 1 illustrates the method in accordance with the present invention in a way corresponding to FIG. A.
Figure 1:
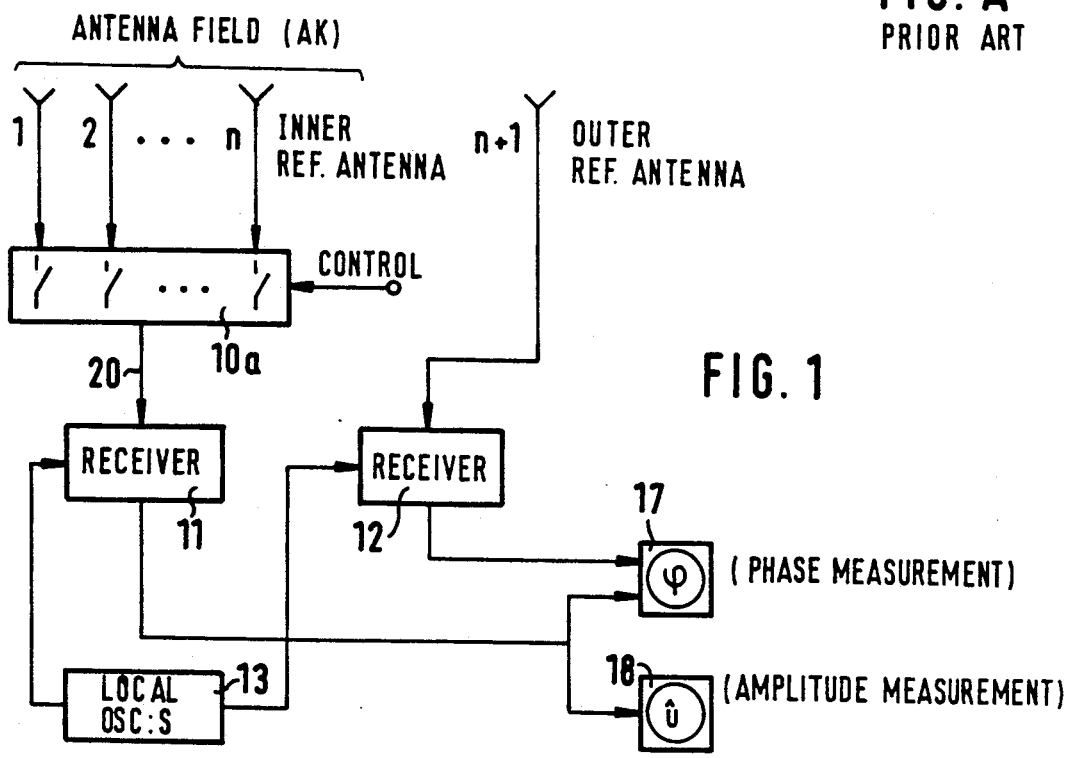

To begin with, with reference to FIG. A, the prior art most closely related to the present invention will be described.

The signals of the antennas in an antenna field consisting of several antennas can be measured from two antennas at a time in pairs, as is described in the source /2/ "Final Report for the Minitrack Tracking Function Description", Volume 2, pp. 39 ... 41, Goddard Space Flight Center, Greenbelt, Md. In such a case, equipment comprising a number of receivers operating parallel is required. A simpler solution is based on two receivers and a rapid change-over switch, by means of which several antennas can be measured rapidly one after the other in relation to one antenna chosen from the antenna field as a reference. Such a prior-art solution is illustrated by FIG. A in the accompanying drawing. According to FIG. A, the antenna selection switch is controlled by means of a unit 10a, which takes care of the timing of the measurements, so that each of the antennas $1 \ldots n-1$ to be measured is connected to the receiver 11 for a short time. In this way, in respect of each antenna $1 \ldots n-1$, the phase difference relative the reference antenna n as well as the amplitude can be read.

When the signal coming from the antenna i is $u_i(t) = \hat{u}_i \sin(\omega t + \phi_i')$ and the signal coming from the reference antenna n is $u_n(t) = \hat{U}_n \sin(\omega t + \phi_n')$, the phase difference between the signal of the antenna i and the signal of the reference antenna n (the desired final result) is $\phi_i = \phi_i' - \phi_n'$.

The symbols:

$i = 1 \ldots n-1$, running number of antenna $n$ = running number of reference antenna $\phi_i'$ = relative phase of the signal of antenna i $\phi_n'$ = relative phase of the signal of antenna n $\phi_m$ = phase measurement result $\Delta\phi$ = phase difference between measurement branches $\omega$ = angular frequency of the signal arriving at antennas $t$ = time $u$ = momentary voltage of signal $\hat{u}$ = peak value of voltage The measurement result obtained from the phase measurement unit 17, which said measurement result is $\phi_{mi} = \phi_i' - \phi_n' + \Delta\phi$, also includes the phase difference $\Delta\phi$ resulting from the transit-time difference between the measurement branches. It has to be established separately by means of calibration in order that it could be subtracted from each result and that the real $\phi_i$ could be found out.

The receivers 11 and 12 operate synchronously so that their local oscillators 13 are common or phase-locked relative one another. The signals coming from the reference antenna n and from the other antennas $i \ldots n-1$ in the antenna field run in two entirely separate branches, which include a considerable amount of cables and receivers, up to the signal phase measurement unit 17. A change in temperature and in other environmental conditions causes a change in the transit time and, at the same time, in the phase in these branches. This, of course, results in an error in the measurements unless the characteristics of the branches are altered to an equal extent relative one another. Therefore, it is important to be able to make both branches as identical to each other as possible, especially the corresponding cables must be precisely of equal length.

In spite of the operations described above, factors that cause phase drift remain in the system of FIG. A. attempts being made to eliminate said factors by means of frequent calibration. For calibration a signal generator 15 is needed whose frequency and power level correspond to the signal that is being measured in each particular case. The signal 15 of the generator is divided by branching means 14 into two branches as well as passed through the antenna selection switch 10a and a particular calibration switch 16 to both of the receivers 11 and 12. In this way, in each particular case, the error that corresponds to a zero phase difference can be measured, under the assumption that the properties of the branching means 14 and of the cables connected to same are not changed. In practice, the cables are quite long (several wavelengths), and, among other things, by the effect of solar radiation they are at times at different temperatures, so that the above assumption is not fully correct, nor is the calibration described above particularly accurate or reliable.

In the following, with reference to FIGS. 1 to 4, the main principles of the invention as well as a preferred exemplifying embodiment of the invention will be described.

The number of factors that cause drift of the phase difference between the measurement branches can be reduced to the lowest possible by means of a preferred embodiment of the present invention illustrated in FIG. 1. As is seen from FIG. 1, compared with the prior-art system shown in FIG. A, one antenna has been added to the system, i.e. an outer reference antenna $n+1$, which does not belong to the antenna field proper AK even though it is located in its immediate proximity. The signals of all the antennas $1 \ldots n$ belonging to the antenna field, including the inner reference antenna n of the field, pass from the antenna selection switch 10a along the same cable 20 and further to the same receiver 11. The phases of the signals of all the antennas $1 \ldots n$ of the antenna field AK, including the inner reference antenna n of the field, are measured in relation to the signal of the outer reference antenna $n+1$.

In a way corresponding to that described in relation to FIG. A, the measurement result obtained from the phase measurement unit 17 is $\phi_{mi} = \phi'_i - \phi'_{n+1} + \Delta\phi$ and for the inner reference antenna n of the field additionally $\phi_{mn} = \phi'_n - \phi'_{n+1} + \Delta\phi$. The phase difference $\phi_i = \phi'_i - \phi'_n$ to be measured is obtained simply by means of the subtraction $\phi_{mi} - \phi_{mn} = \phi'_i - \phi'_{n+1} + \Delta\phi - (\phi'_n - \phi'_{n+1} + \Delta\phi) = \phi'_i - \phi'_n$.

As is seen from the above, the phase $\phi'_{n+1}$ of the signal of the outer reference antenna $n+1$ as well as the phase difference $\Delta\phi$ between the measurement branches disappear, provided that they remain substantially invariable during the measurement. In practice, the changes in $\Delta\phi$, caused by temperature etc., and the change in $\phi'_{n+1}$, caused by a change in the direction of arrival, are so slow that changes taking place during a measurement cycle typically of just a few milliseconds remain insignificant.

By means of the solution in accordance with the invention illustrated in FIGS. 1 to 4, the necessity of continual calibration is avoided and the apparatus required by it (signal generator, branching means, calibration switch, and a few cables) becomes unnecessary. Moreover, the error factors derived from any other sources except changes in the transit times in the antennas of the antenna field proper, their cables, and in the antenna selection switch are eliminated.

In the following, with reference to FIGS. 2, 3 and 4, a preferred embodiment of the invention will be described, which is intended for the measurement of wind by means of a radiosonde and an interferometer in accordance with the invention.

Figure 2:
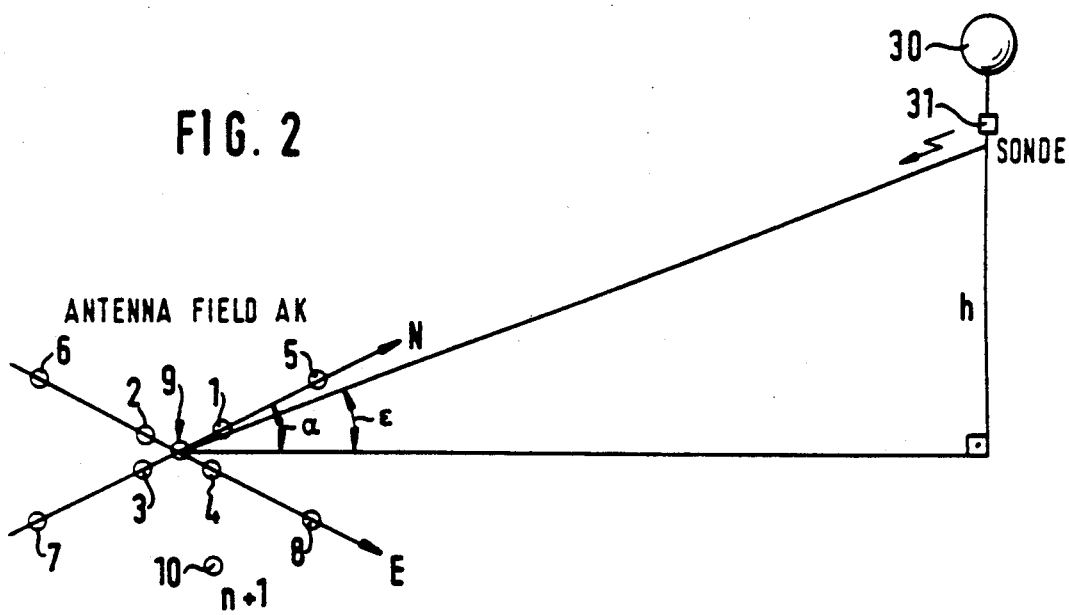
FIG. 2 illustrates the geometry of the locating of a sonde by means of an interferometer in accordance with the invention.

For the measurement of wind, in accordance with FIG. 2, a radiosonde 31 flying by means of a gas balloon 30 is used, which combination 30,31 drifts as passive along with air currents. The wind is found out by locating the sonde 31 at short intervals, whereby the wind speed can be calculated from the displacement that has taken place. For locating the sonde 31, a number of prior-art modes can be used, such as an optical theodolite, a radar, radio-navigation systems, and radio theodolite, all of which have their good and bad sides.

The principle of locating the sonde 31 by means of an interferometer type radio theodolite in accordance with the invention is illustrated by FIG. 2. By measuring the amplitude and the phase of the radio signal coming from the sonde 31, which said signal is assumed to be a plane wave, out of several antennas $1 \ldots 10$ (n=9), whose locations relative one another are precisely known, the azimuth ($\alpha$) and elevation ($\epsilon$) angles indicated by the direction of arrival of the signal can be calculated. Moreover, when the altitude h of the sonde 31 is known with the aid of the air-pressure message transmitted by the sonde, on the basis of these data it is possible to calculate the location of the sonde 31 at each particular time.

In the following, a wind interferometer accomplished in accordance with the present invention will be described, which said interferometer is intended in particular for the measurement of wind by observing the movement of a radiosonde. With slight modifications, the interferometer can also be applied to the locating of any radio transmitter whatsoever and to the observation of the movements of such a transmitter.

Figure 3:
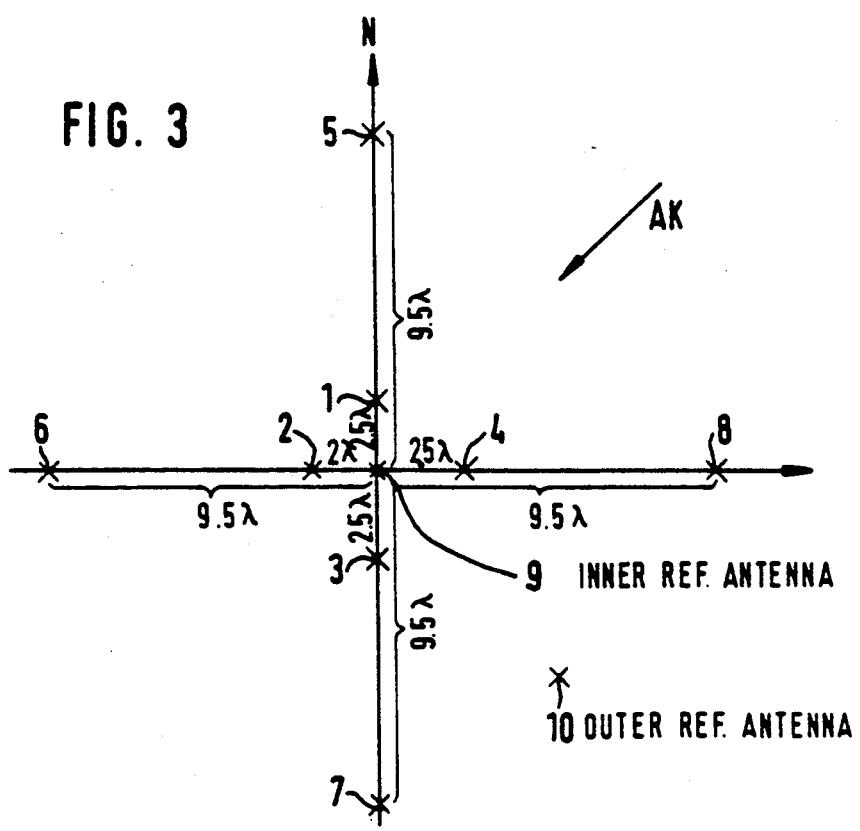
FIG. 3 shows the antenna field of an interferometer in accordance with the invention.

FIG. 3 illustrates an antenna field AK, which consists of an antenna field proper $1 \ldots 9$ to be measured and of an outer reference antenna 10. The antenna field $1 \ldots 9$ proper consists of nine antennas placed on two straight lines perpendicular to one another, the middle one of said antennas being the inner reference antenna of the field.

The innermost antennas $1 \ldots 4$ and the inner reference antenna 9 form a group by means of which an unequivocal directional pattern is obtained. The outer antennas $5 \ldots 8$, together with the inner reference antenna 9, form a group by means of whose long base the accuracy can be improved. The spacings of the antennas illustrated in FIG. 3 in relation to the wavelength illustrate just one advantageous embodiment from among many possibilities. When an improved accuracy is desired for the direction finding, it is possible to increase the distances between the outer antennas $5 \ldots 8$ and, on the other hand, when a lower accuracy is sufficient, they may even be omitted.

The antennas $1 \ldots 10$ should preferably be omnidirectional, as is the vertical element of a quarter wave and the ground plane, and as identical with each other as possible. The outer reference antenna 10 of the field may be different, e.g. a directional antenna, without causing any disadvantage. The location of the antenna 10 can be chosen quite freely, provided that it is not disturbingly close (less than two wavelengths) to any other antenna $1 \ldots 9$ and, on the other hand, not too far from the center point of the field. The distance should preferably not be much larger than the distance of the outer antennas from the center, i.e. from the location of the inner reference antenna 9.

Figure 4:
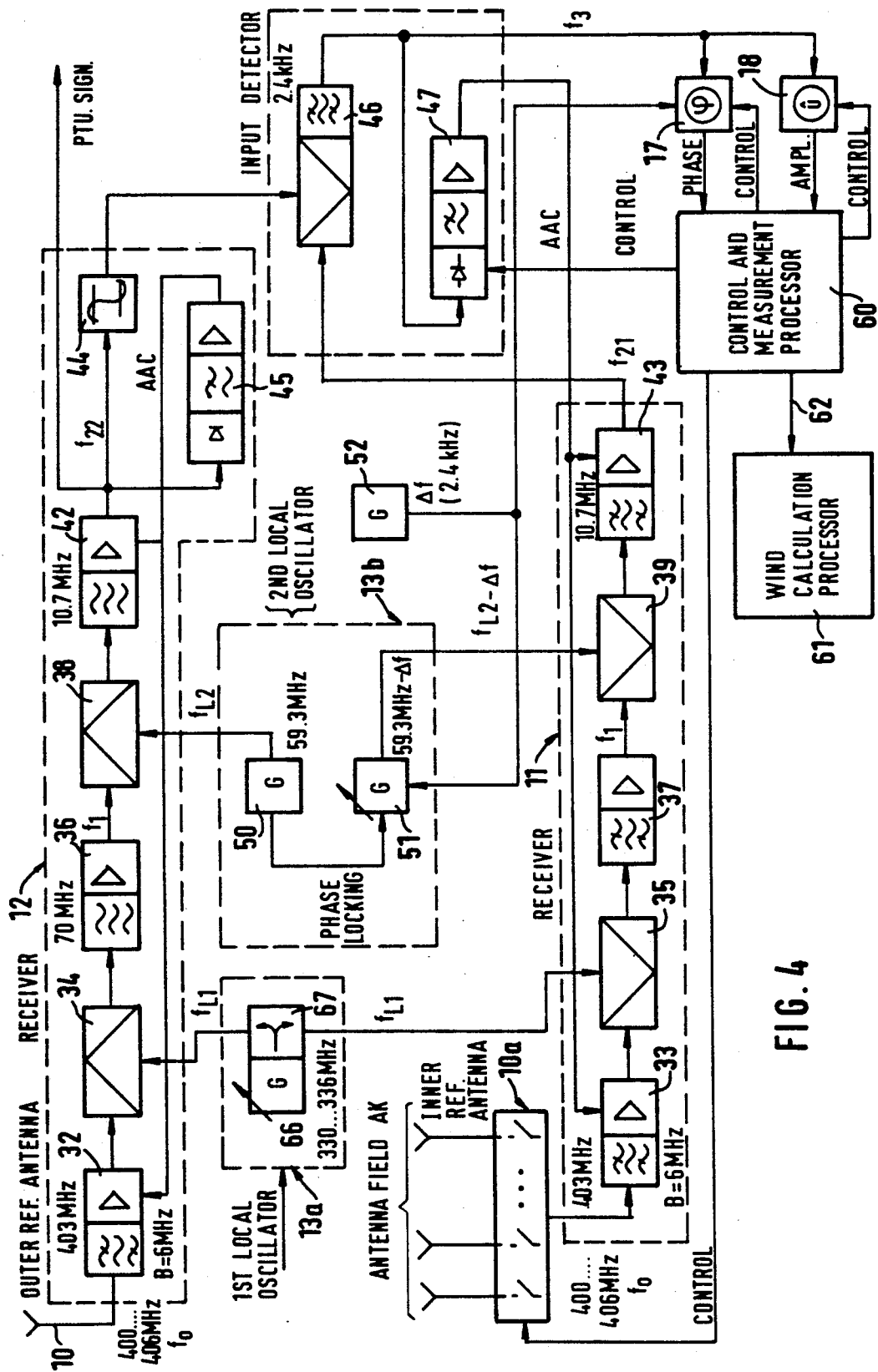
FIG. 4 is a more detailed illustration of the construction and operation of an interferometer in accordance with the invention.

FIG. 4 illustrates the construction of the receiver and measurement equipment at the block diagram level. The equipment is designed for radiosondes of 400 MHz, in which case the frequency range that is required is $400 \ldots 406$ MHz. The equipment comprises two substantially identical double-superheterodyne receivers, the receivers 11 and 12 (cf. FIG. 1). The receiver 12 receives a signal from the outer reference antenna 10 of the antenna field, and the receiver 11 sequentially from each of the antennas $1 \ldots 9$ in the antenna field AK in accordance with the control by the antenna selection switch 10a, which performs the selection.

The input stages 32 and 33 of the receivers 11 and 12 consist of a 403 MHz bandpass filter, whose band width covers the whole frequency range $400 \ldots 406$ MHz, and of an amplifier. The amplified and filtered radio-frequency signal is mixed by means of a diode mixer 34 and 35 with the signal 330 . . . 336 MHz of the first local oscillator 66, whereby the first intermediate frequency of 70 MHz is obtained. Both of the receivers 11 and 12 use a common local oscillator 13a, from which the signal is taken by branching means 67. The first intermediate frequency is filtered and amplified in the first intermediate frequency stage 36 and 37 and is passed to the second mixer 38 and 39. The second local-oscillator signal of the receiver 12 comes from a fixed crystal oscillator 50 of 59.3 MHz. The second local-oscillator signal of the receiver 11 is received from a voltage-controlled crystal oscillator 51, which is phase-locked relative the signal of the other oscillator 50 so that the output frequency is precisely by the frequency $\Delta f = 2.4$ kHz, determined by a separate reference oscillator 52, lower. The intermediate frequency signal of 10.7 MHz obtained from the second mixer 38,39 is filtered and amplified in the second intermediate-frequency stage 42 and 43.

The second intermediate frequency signal of the receiver 12 also includes the data transmitted by the sonde 31 concerning the air pressure, humidity, and temperature, i.e. the so-called PTU-signal, which is passed to a detector of its own for further processing. The second intermediate frequency signal of the receiver 11 is passed to the input detector 46, to whose second inlet the second intermediate frequency of the receiver 12 arrives, having been cut to standard level by means of a limiter 44. From the input detector 46, the difference $f_3$ of the second intermediate frequencies of the receivers is obtained by means of a bandpass filter.

The frequency denotations used in FIG. 4 have the following meanings:

$f_0$ = frequency of arriving signal
$f_1$ = first intermediate frequency
$f_{21}$ = second intermediate frequency in receiver 11
$f_{22}$ = second intermediate frequency in receiver 12
$f_3$ = frequency of detected signal
$f_{L1}$ = frequency of first local oscillator
$f_{L2}$ = frequency of second local oscillator
$\Delta f$ = reference frequency When the denotations of FIG. 4, which were defined above, are used, $f_3 = f_{21} = f_{22}$, and, on the other hand, $f_{22} = f_0 - f_{L1} - f_{L2}$ and $f_{21} = f_0 - f_{L1} - (f_{L2} - \Delta f)$. By placing the latter into the former, what is obtained is $f_3 = \Delta f$. Thus, the difference frequency is equal to the reference frequency $\Delta f$ irrespective of the frequency $f_0$ of the input signal and of the frequencies $f_{L1}$ and $f_{L2}$ of the local-oscillator signals. The difference frequency, however, contains the same amplitude information as the signal arriving in the receiver 11, and its phase difference relative the reference frequency signal $\Delta f$ is proportional to the phase difference between the signals of the outer reference antenna and of the antenna 1 . . . n in each particular case selected by means of the antenna switch 10a. Thus, the measurement result is not affected by any drift of the frequencies $f_{L1}$ and $f_{L2}$ of the local oscillators.

The automatic amplification control (AAC) of the receiver 12 is accomplished so that, from its second intermediate frequency signal, a sample is taken by means of the AAC-detector 45, the voltage obtained from said detector 45 regulating the amplification of the input stage 32 and of the second intermediate-frequency stage 42 while keeping the amplitude of the intermediate-frequency signal invariable. The receiver 11 differs from the above in respect of the AAC-detector 47, which takes a sample from the amplitude of the detected signal. Moreover, the AAC-detector 47 is keyed by means of a control signal so that the sample is taken only when the inner reference antenna n has been selected by means of the antenna switch 10a, and the AAC-voltage is kept unchanged when the other antennas have been selected. Thus, the intensities of the signals of the other antennas do not affect the AAC-voltage.

The control and measurement processor 60 takes care of the timing of the operation and gives the phase-measurement and amplitude-measurement circuits 17 and 18 the sampling commands, whereby they carry out the measurement of the detected signal. The phase difference is measured by means of a digital connection relative the reference signal of 2.4 kHz, and the amplitude measurement takes place by means of a rapid peak-value rectifier.

The antenna selection switch 10a is controlled so that the antennas 1 . . . n in the antenna field proper are passed through in sequence, and between the measurements of the signals of each antenna the signal of the inner reference antenna is measured in order that a sample should be obtained from the signal of the reference antenna n as soon as possible after the measurement of each of the other antennas 1 . . . n−1. In such a case the phase error resulting from drift of transit times etc. factors remains at the minimum. Thus, the measurement sequence is 1,n, 2,n, 3,n, . . . , and several measurements are carried out one after the other. The measurement sequence is repeated at intervals of, e.g., one second, and in this way the result is obtained as an average of several measurements. The measurement of one antenna takes place in about 2.5 ms.

The control and measurement processor 60 converts the phase and amplitude measurement results to digital form and feeds them through the series channel 62 to the wind-calculation processor 61, which calculates the wind direction and wind speed from them and from the sonde 31 altitude data h at intervals of 1 second.

In the following, the patent claims will be given, whereat the various details of the invention may show variation within the scope of the inventive idea defined in said claims and differ from the details given above for the sake of example only.

What is claimed is:

1. Radio theodolite apparatus for measuring a radio signal arriving from a transmitter comprising:

an antenna system including at least three antennas (1 . . . n−1), in an antenna field (AK), which includes an inner reference antenna (n) as well as an antenna selection unit (10a), receiver devices (11), phase-measurement devices (17), amplitude-measurement devices, and control and measurement device(60);

a reference antenna (n+1) not belonging to the antenna field (AK) and a related receiver device (12) connected to the antenna system, whereby the phases of the signals of all the antennas (1 . . . n) belonging to the antenna field can be measured in relation to the reference signal obtained into said receiver device (12); and the outer reference antenna (n+1) is placed at a distance larger than two wavelengths (A) from the nearest other antenna (1 . . . n).

2. An apparatus as claimed in claim 1, characterized in that the receiver devices include two substantially identical double-superheterodyne receivers (11, 12), to one of which said receivers (12) the signal is passed from the reference antenna (n+1) outside the antenna field (AK), and to the other one of the receivers (11) the signals are passed alternatingly from all the antennas (1 ... n) in the antenna field (AK), being selected and controlled by the antenna selection unit (10a).

3. Apparatus as claimed in any of the claims 1 or 2, characterized in that the apparatus includes a control and measurement processor (60), which converts the results of measurement of phase and amplitude to digital form, and that from said processor (60) the measurement results are fed through a series channel (62) to a calculation processor (61) included in the system, which calculates the measurement results, such as wind direction and wind speed, on the basis of changes in the location of the sonde (31).

4. Method in the antenna and receiving system of a radio theodolite, wherein the radio signal arriving from the transmitter of the object (31) to be measured is received by means of at least three, preferably more than three, antennas (1 ... n−1) in the antenna field (AK) as well as by means of an inner reference antenna (n) in the antenna field, the signals received from said antennas being passed to the receiving system, being controlled and selected by an antenna-selection switch (10a), by means of which receiving system the phase differences between the signals of different antennas are detected and measured, on the basis of which phase differences it is possible to calculate the angles of incidence ($\alpha$, $\epsilon$) of the signals on the basis of the known coordinates of location of the antennas in the antenna field (AK) by means of a trigonometric procedure, characterized in that:

an outer reference antenna (n+1) is used which does not belong to the antenna field (AK);

the phases of the antennas (1 ... n−1) belonging to the antenna field and of the inner reference antenna (n) are measured in relation to the reference signal obtained from said outer reference antenna (n+1) and from the receiver (12) connected to same so that no calibration is required between the measurement branches and the reference branches;

the antenna-selection switch (10a) is controlled so that the antennas (1 ... n) of the antenna field are passed through in sequence and that between the measurements of each of the antennas the signal of the inner reference antenna (n) is measured so that a sample is obtained from the signal of the inner reference antenna (n) as soon as possible after the measurement of each antenna so as to minimize any phase errors resulting from drift of transit times and corresponding disturbance factors; and in view of increasing the accuracy of measurement, several sequences of measurements are carried out one after the other and the result is measured as a function of several sequences of measurements.

* * * * *